Jan. 13, 1931. J. REID 1,788,888
METHOD AND MEANS FOR DRAFTING FURNACES
Filed March 19, 1927 4 Sheets-Sheet 2

Inventor
John Reid
By Dowell and Dowell
Attorneys

Jan. 13, 1931.  J. REID  1,788,888
METHOD AND MEANS FOR DRAFTING FURNACES
Filed March 19, 1927  4 Sheets-Sheet 4

Fig. 5.

Inventor
John Reid
By Dowell & Dowell
Attorneys

Patented Jan. 13, 1931

1,788,888

UNITED STATES PATENT OFFICE

JOHN REID, OF NEW YORK, N. Y.

METHOD AND MEANS FOR DRAFTING FURNACES

Application filed March 19, 1927. Serial No. 176,727.

This invention relates to furnaces, and more particularly to boiler-furnace drafting systems.

It aims to provide an improved method and means for supplying and distributively delivering drafting air to furnace fires in adequate volume and under conditions of undisturbed flow calculated to produce the most effective and economic results in the use of fuel.

The invention is herein described with reference to boiler-furnaces of ships wherein drafting systems are required for maintaining the fires of a battery of furnaces in simultaneous operation, and where only a limited volume of air is usually available for the purpose.

An object of the invention is to maintain an efficient air supply under the variable running conditions likely to be experienced in operation and to insure the supply, distribution and delivery of air through a closed fan-draft system under conditions of stream-line flow advantageously eliminating fractious turbulences and back-pressures which cause the delivery to be uncertain and spasmodic at one or more furnaces in a battery, and in general to facilitate the air movement at all points in the system so as to make the distribution substantially equal and most effective at the furnaces.

Another object is to deliver a sufficient air volume to each of the furnace fires at a minimized speed below the critical speed of air delivery, that is, at the lowest possible speed promoting efficient operations which in the majority of vessels approximates ten feet per second at the furnace fronts. Air delivery to the furnace fires above the stated speed is liable to be spasmodic and uncertain, especially in drafting systems of faulty design wherein resistances to air flow therethrough give rise to congestion and fractious turbulences in passage, causing pulsative or sporadic discharge at the fires, any force of disturbance in air flow being greatly magnified by strong fan pressures.

With a draft system embodying appropriate means for effecting the delivery of air to the furnace fires in smooth and undisturbed flow according to this invention, the engineer in charge can easily regulate the air distribution without special adjustment at any one fire or boiler so as to cause all fires to react correspondingly upon any change of fan pressure, thereby developing and maintaining the same to best advantage under running conditions.

Before describing the invention further, the faults of construction and practices in operation of drafting systems now in use will be stated sufficiently to afford a clear understanding and appreciation of the distinctions in structural features and practice claimed for said invention over the prior art systems and practices.

In most vessels, drafting air for the fires of a battery of boiler-furnaces is distributively delivered thereto through conveyor trunks under pressure from a fan in the engine-room, which is usually driven by steam. These air trunks are built-in after the engine and boiler equipment has been installed and are usually accommodated within limited space requiring numerable bends around and over different parts of the engine equipment without particular regard for efficiency. They are designed apparently on the theory that it makes little difference how they are arranged so long as air passage is clear. However, the fact is that so many bends in the trunks, especially abrupt ones, form barriers or obstacles offering resistance to air flow, causing congestion and violent turbulences resulting in pulsative and spasmodic delivery to the fires unless provision is made to insure smooth and undisturbed air flow therearound. When air is forced under high or increased pressures through such faulty trunks, the violence of turbulences, pulsations and static resistances to air flow therein increase to such degree that the condition grows chaotic and it becomes impossible to maintain efficient fires.

Very little thought seems to have been given to this vastly important subject by ship builders and engineers generally, the prevailing impression being that the delivery of adequate volumes of drafting air to the furnace fires depends upon the force of fan pressure through the conveyor trunks. Following the prevailing theory in operation, when one of the furnace fires appears to be receiving an improper supply of air, the marine engineer endeavors to correct the condition by speeding up the draft fan to increase the force of delivery, thereby making the condition worse, for while his action may temporarily improve the firing condition of one boiler, it will almost invariably impair the firing condition of several other boilers in the battery.

Other faults of construction reside in the branching of the air trunks at points where divisions of the air stream are desired. Such faulty constructions are apparently the result of an erroneous theory that a volume of air moving through a conveyor trunk is of substantially uniform density occupying the full area of the trunk and that the desired proportional divisions of the air stream or volume will result naturally from a corresponding division of the inner cross-sectional area of the trunk. In the majority of vessels the air trunks are divided or branched accordingly. For example, where it is desired to effect a division of the air volume in two equal proportions, the inner cross-sectional area of the trunk is divided or branched in half, and where a division in three equal proportions is desired, the area of the trunk is divided or branched in thirds, etc. However, experiments have shown that a volume of air flowing through a bending trunk does not remain of uniform density, nor will it occupy the full area of the trunk either around or between bends, unless means is provided for effecting a stream line flow therethrough. Consequently, in the majority of vessels having drafting systems installed and operated according to general practice, the desired proportional divisions of air supply therethrough are not obtained, which accounts for much inefficient and uneconomic boiler operation. It is an object of this invention, insofar as possible, to cause the moving air volume to occupy the full area of the trunks around and between bends and at all points therein.

A problem always confronting the marine engineer is that of getting an adequate supply of air into the stoke-hold or engine room where the draft-fan is located. As generally known, air must be scooped up and directed below decks by ventilators and oftentimes there is insufficient air available at the draft-fan to supply the furnaces at the rate the fan is run, so that it begins to suck or act in partial vacuum. Under such conditions the air supply becomes inefficient and the volume of flow through the trunks to the furnaces obviously cannot be increased by speeding up the fan, but this nevertheless is what is usually done by marine engineers believing the air supply through the trunks is dependent wholly upon the force of air pressure from the fan. This practice, combined with faulty constructions tending to create disturbances in air flow through the trunks under the conditions hereinbefore stated, renders the firing conditions of the boilers more chaotic with needless consumption of fuel and expenditure of steam in operating the fan.

Still another factor to be considered in attaining the most efficient and economic results in operation, is the off-draft of gases from consumed fuel through the funnel or stack. The off-draft flues built to converge from a battery of boiler-furnaces to the base of one or more funnels, are generally constructed without particular regard for the way in which the gases may most freely pass therethrough, and much inefficient operation is in part occasioned by faulty design in the off-draft flues.

The purpose of this invention is to remedy the faulty constructions and practices in operation of drafting systems now in use, by providing an improved method and means for drafting the furnace fires on an entirely different principle.

The invention will be best understood by reference to the accompanying drawings illustrating one embodiment of a system for supplying and distributing drafting air to the fires of boiler-furnaces according to the improved method or principle embodying this invention.

In said dawings.

The illustrative system is shown applied to a plurality or battery of ship boiler-furnaces 6, which in this instance are of the oil burning type having three burner openings. Said furnaces are connected by suitable uptakes with a smoke-stack or funnel 7 and air to the boiler-room is supplied through ventilators 8 in the usual way.

A driven fan 9, commonly called the "draft-fan", is shown in an adjoining compartment or engine-room section of the vessel by which drafting air is supplied to the furnace fires through the distributive system.

In the majority of vessels the draft-fan has no source of air supply except that available in the engine-room or compartment in which it is located. As air must be directed into said room or compartment by ventilators which are generally inadequate for the purpose, the fan is usually operated under conditions of limited or insufficient air supply. Fans of large size and capacity have generally been employed for the purpose, and according to prior art practice are driven at high speed in order to force available air under high pressure through the system to the fires, as it is generally believed that the requisite supply of air to the fires depends upon the pressure from the fan. The fans of large size driven at high speed require considerable steam power in operation and such fans are not infrequently driven at excessive rates causing heavy vibration oftentimes resulting in damage. Furthermore, high-speed fan operation invariably creates high static pressures and resistances to air flow through the distributive system, with resultant chaotic conditions of air delivery and inefficient operation of the furnaces.

In the present instance, a special ventilator 10 is provided for supplying air direct to the fan, the lower end of said ventilator being shown with branched sections 10ª having bell-mouthed ends discharging into the "eyes" of the fan at opposite sides thereof in order that there may be a plenum of air at all times available to the fan. The draft-fan 9 of the illustrative system is preferably of relatively small size and according to this invention is operated at very low speed requiring negligible steam power in operation. In fact, the preferred speed of fan operation is so low in comparison with prior art practice that in several vessels in which the invention has been applied, it has been difficult to sufficiently reduce the speed of fan operation.

Connected with the discharge mouth of the draft-fan 9 is shown an air conveyor trunk 11 having tributaries or branch-ducts 11ª, 11ᵇ, 11ᶜ and 11ᵈ respectively, through which air supplied from the fan is distributively delivered to the plurality of furnaces 6.

In the majority of vessels, these conveyor trunks are of rectangular form constructed within limited space requiring numerous bends around parts of the engine equipment and are devoid of means for effecting a stream-line flow of the air therethrough. The walls of such trunks offer resistance to free air flow around bending points therein, especially to air moving under high pressure impulse, thereby causing the formation of eddies and static disturbances giving rise to pulsations in the system and resulting in uncertain and spasmodic delivery at the furnace fires. Thus, in prior art systems where the trunks are defective for the reasons stated, the kinetic energy of air in momentum is undesirably converted into static energy or pressures at bends or points of resistance therein, and this static energy of the air must be and is re-converted into kinetic energy in order for the air to continue its flow through the system. Any increase of fan pressure for the purpose of driving the air through the system by sheer force simply magnifies the disturbances and resistances in air movement through the system.

In order to overcome these disturbances, the kinetic energy of the air in momentum through the system should be preserved and according to this invention, means are provided for effecting a stream-line flow of the air around the bends and at all points in the trunk portions of the system.

At the bend in the conveyor trunk 11 above the point where the latter is shown connecting with the evasé or discharge opening of the draft-fan casing, a rectifier 12 is represented comprising a spaced series of radially disposed arcuate or curved guide-vanes or sweeps carried between arm-portions of a movable frame. Said rectifier is provided with means for adjustment exteriorly of the trunk to position causing air under momentum impulse from the fan to flow in directed stream-line movement around the bend. As limited portions of the air may pass between the spaced vanes of the rectifier, the total volume is substantially uniformly distributed throughout the full area of the trunk bend and is smoothly deflected therearound, so that the kinetic character of air movement is preserved.

Where other bends in the trunks occur, correctors 13 similar to or corresponding with the rectifier 12 are advantageously placed. In the illustrative system, a corrector 13 is shown comprising a radially disposed spaced series of curved vanes or sweeps angularly adjustable by means of a manually movable rod 13ª to position causing the undisturbed and stream-line flow of air around the bend in which it is located. The vanes of the corrector act similarly to the vanes of the rectifier 12 to preserve the kinetic characteristic of air movement through the trunk and to cause its substantially uniform distribution throughout the area of the bending trunk.

Where short bends of elevation or depression occur in the trunks, corrector devices similar to the corrector 13 are advantageously placed. At such a point in the main trunk portion, a corrector device 14 is shown comprising a shutter-like arrangement of guide-vanes adjustable similarly to the corrector 13 to angular position causing the undisturbed deflection and stream-line flow of air in proper direction and uniform occupation of the trunk area. Such a device tends to further preserve the kinetic characteristic of air movement through the trunks.

Where gradual bends occur in the trunks, it is desirable to place a slightly curved plate 15 conforming substantially to the angular trend of the trunk so as to cause substantial proportions of the flowing air volume to pass along opposite sides thereof and aid its directional movement through the trunk.

As air has a tendency to flow in somewhat greater density in the center of the trunks and there is more or less friction along the walls thereof, it is advantageous to arrange spreading or distributive elements at different points in straight sections of the trunks. In a straight section of the main trunk, a distributive element 16 is shown comprising a honeycomb arrangement of thin vertical and horizontal plates or vanes between which limited portions of air volume may pass, so that the total volume of air in movement through the trunk is caused to spread out and occupy substantially the full area of the trunk in flowing through said element.

In the illustrative system, the rectifier, corrector and distributive elements are shown in close proximity, each comprising in one form or another, an arrangement of guide-vanes of curvature or alinement conforming substantially to the directional trend of the trunk and the proper line of air movement therethrough. In installing or re-constructing a system, these director elements would not probably be arranged in such close proximity, but are so represented for purposes of illustration in a comparatively short trunk body. In practice it may be advantageous to use such elements not only at appropriate points in the main trunk body, but also at points in the tributary trunks or ducts leading to the individual furnace fires. The employment of said elements or their equivalents at points in the tributary trunks is contemplated as working requirements or corrective measures may suggest.

Where branching of the conveyor trunks is desired for effecting a proportional division of the air supply volume in diverging directions for delivery in corresponding amounts to a plurality of furnaces, the prior art practice is to branch the trunks on divisional lines directly proportional to the desired air volume division, i. e., to divide the inner cross-sectional area of the trunks according to the desired air volume division, no provision being made to assure that the desired air volume division takes place. This practice is followed apparently on the theory that the desired division will follow in consequence of air moving in uniform density through the trunks. However, air does not ordinarily move through the conveyor trunks with uniform density throughout the trunk area, even though means may be provided for effecting a stream-line flow therethrough and the expected divisions of air volume rarely result, so that the amounts delivered to the furnace fires have not heretofore been substantially equalized either in volume or rate of flow.

In order to effect the desired division of air volume at branching points in the trunks, swinging flaps or gates 17 are shown manually adjustable exteriorly of the trunks to position for enlarging or narrowing the branch-trunk openings and increasing or decreasing the amount of air volume flowing thereinto, so that the proportions of air supply flowing into the branch or tributary trunks may be equalized or regulated as desired. By such means the engineer is enabled to control the air divisions into the tributary trunks according to working requirements. When the gates of a system embodying this invention have once been adjusted to appropriate position, no further adjustment will ordinarily be found necessary and all the fires will respond correspondingly upon any change of fan pressure.

Where a division of the air volume flowing through one of the branch or tributary trunks is desired, as for instance in the branch 11$^c$ of the illustrative system, a similar gate 18 should be provided for a like purpose.

At bending points in the branch or tributary trunks, director vanes or sweeps 19 corresponding in form and purpose to the corrector vanes 13, are advantageously provided in order to effect a stream-line flow of the air therearound and preserve the kinetic characteristic of the air movement. If the tributary trunks are of sufficient size to permit it, rectifier or corrector elements corresponding with the elements 12 and 13 may be employed as hereinbefore stated.

At points where the tributary trunks or ducts deliver air to the furnace fronts or air-heaters thereof, the usual prior art practice is to extend a curved plate or scoop partly into the trunk for catching or deflecting a portion of the air volume flowing therethrough and directing it into the furnace or heater. Such scoops are alone inadequate for the purpose as they do not ordinarily catch or deflect the required air volume for delivery to the furnace fires, nor do they segregate or trap at the respective furnaces, a proper proportion of the air volume flowing through the trunk to adjacent furnaces so as substantially to equalize the air volume delivery at all furnaces. This is especially true in systems of faulty design where the air movement through the trunks is unduly turbulent and spasmodic. Under such conditions the respective fires will not be correspondingly responsive to changes in fan pressure, so that inefficient operation of one furnace cannot be corrected by varying the speed of fan operation, without injuriously affecting the operation of other furnaces.

In the illustrative system, the tributary trunks or ducts deliver air to air-heaters 20 of the furnaces through central openings therein. The air-heater spaces are shown divided by diaphragm plates 21 having curved portions 21ª extending into the trunks providing "pickups" for catching a sufficient portion of the air volume moving therethrough and directing the same into one side of the air-heater. These extensions of the diaphragm plates are of a length calculated to trap and cause equal proportions or volumes of air to enter the heaters at each furnace. To assure equalized delivery at all furnaces, small adjustable flaps or gates corresponding with the gates 17 may advantageously be provided on the ends of each diaphragm plate. At the concave sides of the "pickup" portions of the diaphragm plates, the walls of the tributary trunks are shown with curved portions 22 having edges registering with the heater opening and conforming substantially with the "pickup" curvature so as to cause an undisturbed and stream-line flow of the air into that part of the air-heater opening on what may be called the windward side thereof, the air entering at such point being given a partial rotation aiding its turn around 180 degrees in passage through and down that side of the heater. Opposite the air-heater openings, the outer walls of the tributary trunks are shown with outwardly extending curves 23 of larger arc, conforming substantially with the curvature of the "pickup" portions of the diaphragm plates and providing enlargements in the trunk bodies enabling the remaining or unscooped proportions of air volume in the trunks to pass smoothly around or beyond the convex sides of the "pickups", depending upon whether the trunks terminate or extend to adjacent furnaces. Where the tributary trunk terminates at a furnace, the curved trunk wall 23 is extended to register with the opposite side of the heater opening so that the remaining air volume may enter smoothly at that side of the heater in substantially equal proportion with the amount entering at the windward side thereof. However, where the trunk extends from one furnace to another, a complementary "pick-up" for the heater opening of the preceding furnace is provided, which in the form shown comprises a curved scoop-plate 24 registering with the leeward side of said opening behind the main "pickup" portion 21ª of the diaphragm plate and conforming substantially to the curvature of the latter. The complementary "pickup" causes the required volume of air to enter smoothly at the leeward side of the heater opening and yet allows the necessary air volume to pass therearound to the adjacent furnace. It may also be advantageous to provide an adjustable gate on the end thereof similar to the gates 17 hereinbefore described.

A system embodying trunk portions of stream-line construction with means for effecting the undisturbed flow of air therethrough under momentum impulse from the draft-fan is thus provided together with flow control means for the air.

According to this invention, the draft-fan 9 is driven at the lowest permissible speed in order to minimize the air pressures in the conveyor trunks and to minimize the excess of air delivery at the furnaces. The fan power and driving speed required for delivering and distributing adequate volumes of air to the several furnace fires will be limited to that sufficient merely to create the necessary velocity of air movement at a modified rate not generally exceeding ten feet per second at the furnace fronts. A slow speed rotation of the draft-fan would in itself tend to reduce air pressures and violence of turbulences in a system of faulty construction, but a system of stream-line construction embodying means for effecting an undisturbed flow of air therethrough according to this invention, will virtually eliminate fractious turbulences and static air-pressures, even though the speed of fan operation may be increased. This invention therefore provides what may aptly be called a "double-check" against static pressures or resistances and undesirable turbulences in air flow through the conveyor trunks.

In order to obtain the most efficient and economic results in furnace operation, the air delivered thereto according to the method and means embodying this invention should be utilized to the best advantage, as it is not alone sufficient for the air to be delivered to the furnaces in undisturbed movement under modified pressure. When a system embodying this invention is employed in connection with coal burning furnaces, the air is delivered at the ash-pit openings, while in oil burning furnaces it is delivered to the air-heater spaces thereof as illustrated and hereinbefore described.

The most efficient and economic utilization of air delivered to coal burning furnaces may be obtained by a circulation therethrough according to the method and means disclosed in my co-pending application Serial Number 122,948, filed July 16, 1926, for improvements in air draft systems for furnaces.

Where the invention is applied to oil burning furnaces as in the present instance, the air discharged into the air-heater spaces thereof is heated and passes down delivery nozzles 25 on opposite sides thereof toward the burner openings 26. At bending points in said delivery nozzles, spaced curved vanes 27 are shown for guiding the heated air in undisturbed flow therearound toward the burner openings around which it flows in divided currents.

With defective air delivery systems operated according to prior art practice, it has been difficult if not impossible to obtain the ideal flame condition because of the pulsative and spasmodic discharge of air into the burner openings for mixture with the oil sprayed through the burners producing the flame. When air is discharged through the burner openings under too great a pressure, as has heretofore usually been the case, it is shot past the sprayed oil ring with resultant latent combustion toward the back of the furnace, which is most undesirable and inefficient. When pulsative and spasmodic delivery at the burner openings is coincident with high fan pressure, the flame cannot be maintained constant and the condition is made considerably worse. Following out the hereinbefore described principles of directed stream-line flow through the system, curved guide-vanes 28 and 29 are shown in inverted V arrangement below the burner openings for causing a regulated conjunction of air currents from around said openings and directing the air with a moderated rotary or swirling movement into the annular spaces surrounding the usual cone deflectors 30 so as to envelope the oil cone from the burner nozzles, with resultant early combustion at the fronts of the furnaces. Said vanes so arranged control the air movement to prevent undue agitation in passage through the burner openings so that the efficiency of air delivery will not be impaired at such points where a moderated turbulence of a swirling character as distinguished from fractious turbulence of air movement is expressly desirable. The best results will follow from a concentrated spiral flow of the air downwardly under the flame to counteract the tendency of the misted oil cone to throw its heavier globules toward the bottom of the furnaces.

Figure 1:
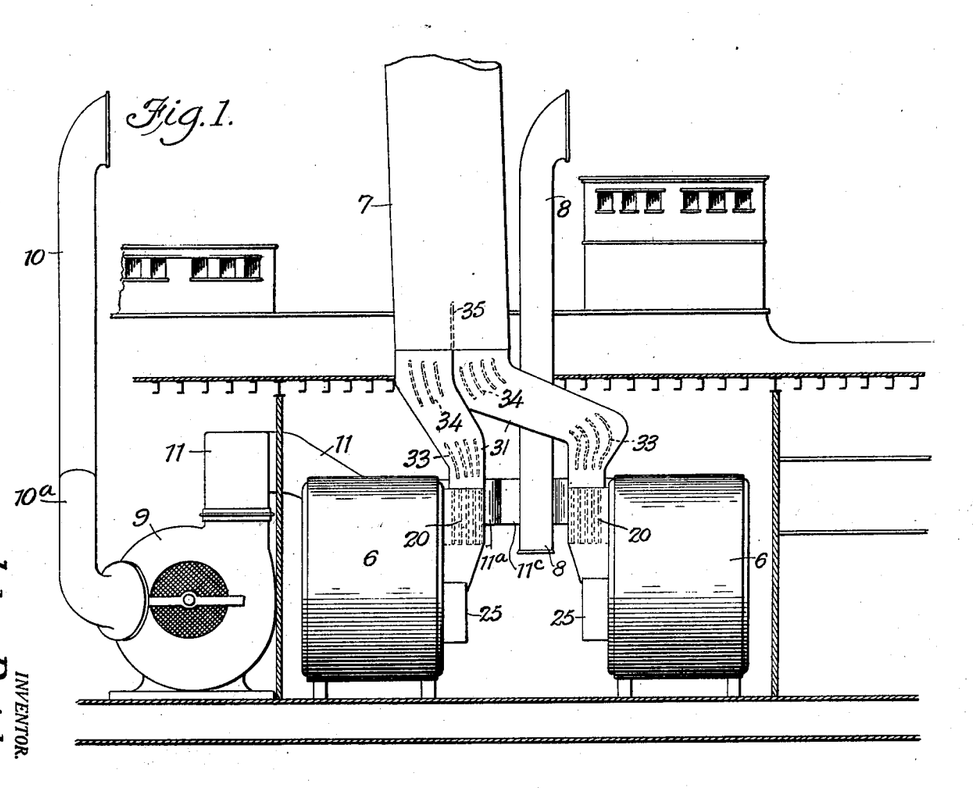
Fig. 1 is a somewhat diagrammatic representation of the boiler room of a vessel on the line of a longitudinal section therethrough, showing the boilers and associated drafting system with fan and off-draft flues.
Figure 2:
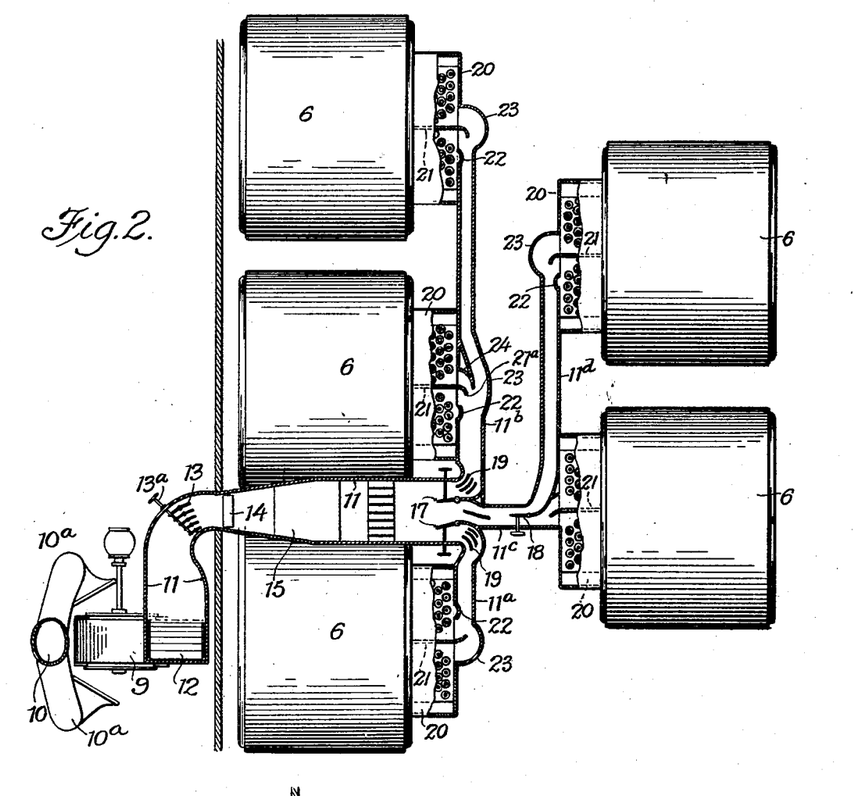
Fig. 2 is a plan view of a battery of boilers with parts of the air draft system shown in sections.
Figure 3:
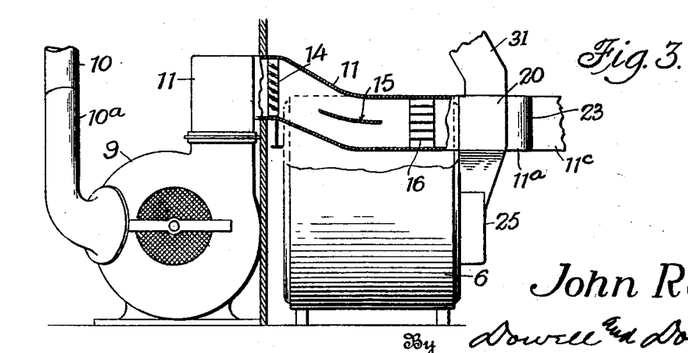
Fig. 3 is a side elevation in representation of one of the boilers, with a portion of the main trunk of the drafting system shown in longitudinal section.
Figure 4:
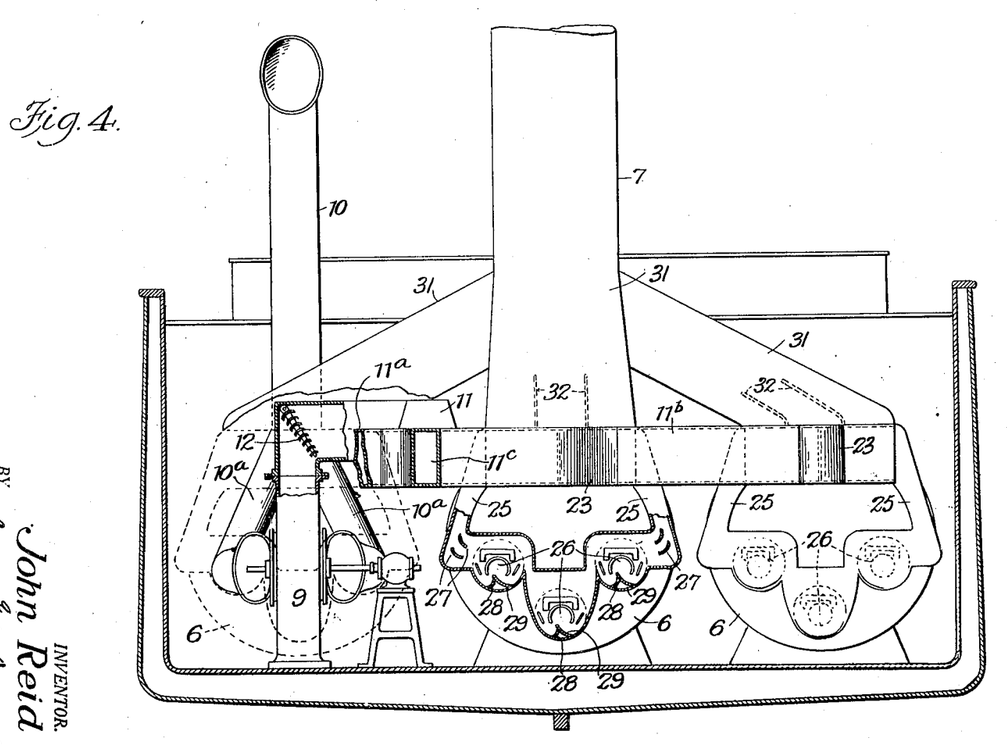
Fig. 4 is an elevation partly in section taken transversely of the vessel through the boiler room.
Figure 5:
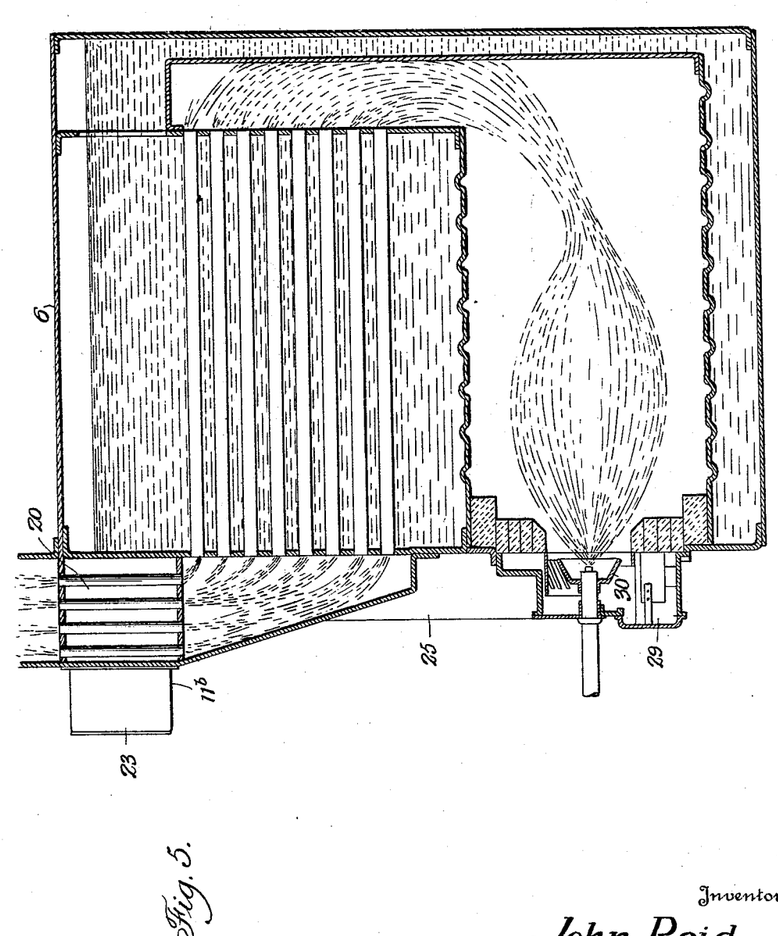
Fig. 5 is a sectional side elevation of one of the boilers.

In a distributive system embodying this invention, operated according to the method embodying the same, it will be found possible to maintain a constant and efficient flame at the front of the furnace as illustrated in Fig. 5, which is the ideal condition, since the atomized oil is completely combusted before reaching the back of the furnace and the flame is supported below the boiler area between the moderate air pressure at the front of the furnace and the suction of the off-draft at the back thereof. For efficient combustion, it is important that the volume and rate of air flow into the furnaces behind the flames should be sufficient to just overcome the tendency of the fires to backfire or throw back into the furnace fronts under a minimum delivery of excess air. In other words, the volume and speed of air delivery to the fires should be minimized to an extent only slightly in excess of that required for flame propagation. That is, since the stack-draft conditions are largely unalterable, the fan-draft should be regulated so as substantially to balance the volume and speed of air delivery to the fires against the force of stack suction at each furnace in order to obtain the best results in fuel consumption. Such regulation causes the fires to burn with an even beat or short period pulsation, the fires in all furnaces being simultaneously and correspondingly controllable by the fan action. After the proper adjustments have once been made, if the fire in one furnace is properly drafted, the fires in all the furnaces will be correspondingly drafted and will respond simultaneously to any change of fan action regardless of changes occurring in the furnace draft or stack induction.

Although the stack draft conditions are largely unalterable as above stated, too little attention is oftentimes given to the construction and arrangement of the off-draft breechings or flues leading from the furnaces to the stack or stacks. In the majority of vessels, no provision is made for directing the waste gases or products of combustion in smooth and unretarded flow through the uptakes. Uptakes or breechings leading to the stacks or funnels should be so designed that the off-draft action therethrough upon the several furnace fires from the stack "pull", will be substantially equalized under changing conditions of wind, weather and temperature, and since stack "pull" varies with temperature, atmospheric conditions and wind action across the tops thereof, it is preferable to divide and cap the stacks so as to equalize their action to the breechings.

Efficient results may be obtained by incorporating in the breechings, some of the principles of the air delivery trunks embodying this invention. In the illustrative system the breechings 31 are shown with outwardly extended curved walls at bending points therein for enlarging the trunk area and permitting free passage of gases therearound. Within the breechings where the latter connect with the furnace air-heaters, are represented division plates 32 for equalizing the stack "pull" therethrough to the furnace fires. At bending points therein, series of spaced guide-vanes 33 and 34 are represented in curvature conforming substantially to the directional trend of the trunks for effecting a stream-line flow of the gases therethrough, similarly to the rectifier and corrector elements 12 and 13 hereinbefore described. Where the breechings convergingly connect with the bottom of the stack 7, a division plate 35 is represented for equalizing the stack "pull" to the breechings, said plate being preferably adjustable for the purpose.

An ideal drafting system producing effectual and economic results in furnace operation according to the method embodying this invention is thus provided. The invention, dealing with the delivery and utilization of air from the point of supply from above decks to the point of discharge at the funnel top, is applicable mutatis mutandis to any closed draft system for furnaces whether of the coal or oil burning type.

In the case of a new vessel, the complete system may be installed with the various features and factors correlated toward the highest efficiency and economy in the use of fuel.

In the case of an old vessel in which complete replacement may not be desired, the existing system may be altered and corrected to embody certain features of the invention affording improved results in operation closely approximating that of the new system, without great expense.

The principle involved is the same in each case, that is, the fan power should never be depended upon to overcome resistances in air distribution and delivery. Resistances to air flow may be virtually eliminated in a system embodying the principles of construction and operation according to this invention.

The advantages of this invention and its improvement over prior art constructions and practices will be appreciated, especially by ship owners who for many years have been concerned with increasing losses resulting in uneconomic use of fuel from errors in construction, equipment and operation of forced draft systems of the prior art. By applying the improved method and means embodying this invention either to new or old vessels, tremendous saving in fuel and far more efficient operation will result. The cost of installation of the improved system in a new vessel does not exceed that of the normal equipment, while the cost of correcting the system of an old vessel would not probably exceed the amount saved in fuel consumption in a few months operation. In vessels to which the invention has been applied, savings as high as 15 to 20 percent in fuel consumption have been recorded. The value and importance of the invention in its advance of the art will therefore be obvious.

Since various constructions and arrangements with numerous combinations and subcombinations of elements and equivalents embodying this invention may be made without departing from the spirit and scope thereof, it is not intended that the appended claims shall be limited to the specific construction and arrangement hereinbefore illustrated and described.

Having thus described my invention, what I claim as new and desire to secure by Letters Patent of the United States is:—

1. The improved method of producing combustion of fuel in furnaces located within a substantially enclosed space under conditions of limited air supply and forced indirect delivery thereto, which consists in drawing air from the outer atmosphere toward a point removed from said enclosed space but also under conditions of limited air supply, supplying such air along a predetermined path from said point to the furnaces under continuous and steady low-pressure impulse inducing gentle momentum flow, preserving a gentle and unturbulent flow of the air along its said path of movement to the furnaces, and maintaining a continuous and steady evacuation of gases from the furnaces in substantial balance with the volume and momentum of the air delivery thereto.

2. The improved method of producing combustion of fuel in furnaces located within a substantially enclosed space under conditions of limited air supply and forced delivery thereto along a tortuous path, which consists in drawing air continuously from the outside atmosphere toward a point outside and remote from said enclosed space, directing such air under continuous and steady low-pressure impulse from said point along its predetermined path to the furnaces, dividing and distributing the air in substantially equalized proportions to the respective furnaces while preserving an undisturbed stream-line flow of the air in its tortuous conduct and distribution thereto, imparting a desirable turbulence to the air at the points of discharge into the fire chambers of the furnaces, and maintaining a continuous and steady evacuation of gases from the furnaces in substantial balance with the volume and speed of the air delivery thereto.

3. A system for producing combustion of fuel in a plurality of furnaces located within a substantially enclosed space under conditions of limited air supply and forced delivery thereto along a tortuous path, comprising in combination; conveyor trunks having distributive ducts for conducting air to the furnaces from a point outside and remote from said space but also substantially enclosed under conditions of limited air supply, means for drawing air continuously from the outer atmosphere toward said point, means for directing such air into and through said trunks under continuous and steady low-pressure impulse inducing gentle momentum flow therethrough, means within said trunks and ducts causing divisional flow of the air volume thus supplied so as to assure distributive delivery to the several furnaces in substantially equalized proportions, means including out-sweeping bend constructions of said trunks and ducts and the arrangement of director vanes therein to induce and preserve a continuous stream-line flow of the air therethrough to and into the furnaces, means disposed in the fire chambers of the furnaces for imparting a moderated turbulence to the air at such points of discharge thereinto, and means maintaining a continuous, steady and stream-line evacuation of gases from the furnaces in substantial balance with the volume and speed of the air delivery thereto, whereby the drafting action within the plurality of furnaces will be simultaneously and correspondingly responsive to and controllable by the action of the aforesaid means for directing air through said trunks.

4. In combination with the air impeller and conveyor trunks of a closed draft system for producing combustion of fuel in a plurality of furnaces located within a substantially enclosed and confined space under conditions of limited air supply and forced delivery thereto along a tortuous path from another substantially enclosed space outside and remote therefrom, the improvement which consists in the provision of means including out-sweeping bend constructions of said trunks and the arrangement of director vanes therein to induce and maintain an undisturbed stream-line flow of air therethrough under momentum impulse from the air impeller, means including vanes deposited in said trunks to effect divisions of the air volume flowing therethrough for distributive delivery to the respective furnaces in substantially equalized proportions, means provided by the trunk walls of contour effecting a smooth and eddyless delivery of air into the respective furnace openings, and means effecting a continuous, steady and stream-line off-draft of gases from the furnaces in substantial balance with the volume and speed of the air delivery thereto through the system.

5. In combination with the air conveyor trunks and draft fan of a closed-draft system for suppling equal and adequate volumes of air at minimum velocities and pressures simultaneously to a plurality of furnaces located within a substantially enclosed and air-rarified space under conditions of limited air supply and forced delivery thereto along tortuous paths from another substantially enclosed space outside and remote therefrom, the improvement which consists in the provision of means including director vanes within the trunks at bending, divisional and straight sections thereof effecting a stabilized, stream-line and non-turbulent flow of air therethrough under momentum impulse from the fan, means effecting division of the flowing air volumes for distributive delivery to the respective furnaces in substantially equalized proportions, means provided by the trunk walls of contour effecting a smooth and eddyless delivery of the distributed air volumes into the respective furnaces, and means for imparting a moderated turbulence to the air at points of discharge into the fire chambers of the furnaces, said incoming air to the trunks always following in the wake of the funnel off draft and completely filling the trunks with a constant and onwardly moving stream.

6. The improvement in conveyor trunks of a closed draft system including a draft-fan for distributively supplying drafting air to a plurality of furnaces located within a substantially enclosed space under conditions of limited air supply and forced delivery thereto along a tortuous path from another substantially enclosed space, which consists in forming the trunks with enlarging outwardly extended curves in the outer walls at bending, divisional and delivery points thereof, arranging guide-vanes within the trunks at bending or curving points therein on lines of curvature conforming substantially with the directional trend of the trunks, providing flow distributive and directorate vanes within the trunks at points along straight sections thereof and providing adjustably movable gates at divisional or branch points in the trunks for regulating the proportional distribution of the air volume flowing therethrough, whereby a regulated, uniform and stream-line flow and distribution of air supply through the trunks to the respective furnaces may be maintained under moderated pressure and control by the draft fan.

In testimony whereof I affix my signature.
JOHN REID.